(12) United States Patent
Matsuo

(10) Patent No.: US 6,320,185 B1
(45) Date of Patent: Nov. 20, 2001

(54) IMAGE DETECTION APPARATUS

(75) Inventor: Yuichiro Matsuo, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/311,492

(22) Filed: May 13, 1999

(30) Foreign Application Priority Data

May 18, 1998 (JP) ................................................. 10-135169

(51) Int. Cl.$^7$ .................................................. G01D 5/34
(52) U.S. Cl. .................. 250/231.13; 250/231.18
(58) Field of Search ........................... 250/208.1, 231.13, 250/231.14, 231.16, 231.18; 356/617; 341/13, 31

(56) References Cited

U.S. PATENT DOCUMENTS

| | | | |
|---|---|---|---|
| 5,129,725 | * 7/1992 | Ishizuki et al. | 250/231.14 |
| 5,587,832 | 12/1996 | Krause . | |
| 5,965,879 | * 10/1999 | Leviton | 250/231.13 |

FOREIGN PATENT DOCUMENTS

| | | |
|---|---|---|
| 40 23 292 A1 | 1/1992 | (DE) . |
| 44 29 966 C1 | 1/1996 | (DE) . |
| 9-80315 | 3/1997 | (JP) . |
| 9-297267 | 11/1997 | (JP) . |
| WO 97/31282 | 8/1997 | (WO) . |

* cited by examiner

Primary Examiner—John R. Lee
Assistant Examiner—Kevin Pyo
(74) Attorney, Agent, or Firm—Frishauf, Holtz, Goodman, Langer & Chick, P.C.

(57) ABSTRACT

While a pinhole disk with pinholes is being rotated, a confocal image of a surface of a sample, which has passed through the pinholes, is imaged by a CCD camera. A vertical sync signal extraction circuit extracts a vertical sync signal from an image signal output from the CCD camera. A photodetector element senses the rotational state of the pinhole disk. A phase sync circuit synchronizes the phase of the vertical sync signal from the vertical sync signal extraction circuit with the phase of a sensor signal from the photodetector element, thereby controlling a drive motor for driving the pinhole disk.

18 Claims, 9 Drawing Sheets

IMAGE DETECTION APPARATUS

BACKGROUND OF THE INVENTION

The present invention relates to an image detection apparatus for use in observing or measuring a minute structure or a three-dimensional structure of a sample.

A Nipkow type confocal microscope, which uses a so-called Nipkow disk having many pinholes arranged in a spiral with an equal pitch, is well known as a confocal microscope which is a type of an image detection apparatus.

The confocal microscope obtains a confocal image of a sample by optically scanning the sample, while rotating the Nipkow disk by means of a motor. Accordingly, if a confocal image of the sample is picked up by a CCD camera, etc., a brightness/darkness fringe may occur in a picked-up image due to non-uniform scanning unless the scan cycle of the disk is synchronized with the image pick-up cycle of the CCD camera.

To solve this problem, Jpn. Pat. Appln. KOKAI Publication No. 9-297267, for example, discloses a motor control apparatus for a confocal microscope. FIG. 1 shows a schematic structure of the motor control apparatus. A vertical sync signal extraction circuit 2 extracts a vertical sync signal from an NTSC (National Television System Committee) type signal output from a CCD camera 1. A frequency multiplier circuit 3 multiplies the vertical sync signal and produces a control signal for a motor drive circuit 4. The motor drive circuit 4 drives a motor 5 at a speed corresponding to the control signal. Thereby, the disk speed for scanning the surface of the sample is synchronized with the image pick-up cycle of the CCD camera 1.

Since this motor control apparatus can control the rotation of the motor 5 with use of the NTSC signal from the CCD camera 1, even if the NTSC signal fluctuates, the rotation of the motor 5 can be synchronized in accordance with NTSC signal.

Jpn. Pat. Appln. KOKAI Publication No. 9-80315 discloses another apparatus for solving the problem due to non-uniform scanning. In this apparatus, scan start detection pinholes are provided at beginning points of scan tracks on the disk. A photodetector photo-electrically converts light, which has passed through the scan start detection pinhole, and synchronizing means produces a trigger signal for an image pick-up apparatus. Thereby, the scan cycle is synchronized with the image pick-up cycle to solve the problem of non-uniform scanning.

FIG. 2 shows a schematic structure of this apparatus. A scan disk (Nipkow disk in this example) 7, as shown in FIG. 3, has scan tracks 13 (indicated by hatching) provided with many pinholes like a conventional Nipkow disk, and scan start detection pinholes 14 arranged on a circumferential area of the scan tracks 13 at scan beginning points. A photodiode 8 serving as a photodetector is disposed at such a position as to receive light passing through the scan start detection pinholes 14. A current/voltage converter circuit 9 converts a current produced by the photodiode 8 to a voltage. A voltage comparison circuit 10 compares a signal from the current/voltage converter circuit 9 with a reference voltage 11 and digitizes the magnitude of the signal voltage. The resultant digital signal is output to an externally connected image pick-up apparatus 12 as an imaging sync signal (a trigger signal).

In the above structure, incident light 6 is radiated on the surface of the Nipkow disk 7. In this case, a diameter r of a beam of incident light 6 is set such that the light 6 can illuminate both the scan tracks 13 and scan start detection pinhole 14. In this state, the Nipkow disk 7 is rotated, and the incident light which has passed through the scan track 13 scans the sample in a multi-point scanning manner. On the other hand, the incident light which has passed through the scan start point detection pinhole 14 is received by the photodiode 8 each time the scan start detection pinhole 14 passes over the photodiode 8.

In this case, an output current from the photodiode 8 varies in a pulsating manner. The variation in current is converted to a voltage in the current/voltage converter circuit 9. A voltage signal from the converter circuit 9 is input to the voltage comparison circuit 10 and compared with a predetermined reference voltage 11. Thus, a signal of a voltage pulse sequence having the cycle synchronous with the scan cycle is output. This pulse-sequence signal is output to the external image pick-up apparatus 12 as a trigger signal. Thereby, the rotational cycle of the Nipkow disk 7 can be synchronized with the imaging cycle of the image pick-up apparatus 12.

In the structure disclosed in Jpn. Pat. Appln. KOKAI Publication No. 9-297267, the vertical sync signal is extracted from the NTSC signal output from the CCD camera 1 which images the surface of the sample, the extracted vertical sync signal is multiple, and the multiplied signal is output to the motor drive circuit 4 as the motor control signal. Since the signal flows in one direction in the respective components, a fluctuation in the rotation of the disk, which may occur due to eccentricity of the disk or friction of the motor shaft, cannot be fed back. Even if the frequency multiplier circuit 3 and motor drive circuit 4 perform the control based on the NTSC signal from the CCD camera 1, once a fluctuation occurs in the rotation of the disk due to the eccentricity of the disk or friction of the motor shaft, the scan cycle of the disk becomes asynchronous with the imaging cycle of the CCD camera 1 and a brightness/darkness fringe may occur in the screen image.

Besides, in the structure disclosed in Jpn. Pat. Appln. KOKAI Publication No. 9-80315, the scan start detection pinholes 14 are formed at the beginning points of the scan tracks on the Nipkow disk 7. The light which has passed through the scan start detection pinhole 14 is detected to produce the trigger signal for the image pick-up apparatus 12. On the basis of the trigger signal, the imaging timing of the image pick-up apparatus 12 is controlled and the vertical sync signal of the image signal is reset. In this case, however, if a fluctuation occurs in the rotation of the disk due to eccentricity of the disk or friction of the motor shaft, the scan start detection pinhole 14 cannot pass, at regular cycles, over the photoelectric converter 8 for generating the trigger signal. Because of this, the cycle of the trigger signals applied to the image pick-up apparatus 12 becomes irregular and also the cycle of the vertical sync signals of image signals output from the image pick-up apparatus 12 varies. Consequently, images on the TV monitor are flickering and the observation of the sample cannot be performed.

BRIEF SUMMARY OF THE INVENTION

An object of the present invention is to provide an image detection apparatus capable of obtaining a screen image free from problems of non-uniform disk scanning and occurrence of a brightness/darkness fringe.

Another object of the invention is to provide an image detection apparatus capable of obtaining a bright image of a sample even if the brightness of the sample is low.

Still another object of the invention is to provide an image detection apparatus capable of obtaining an image with high efficiency of use of light.

According to a first aspect of the invention, in order to achieve the above objects, there is provided an image detection apparatus comprising:

a rotary member having a light-transmission pattern;

a rotary drive unit for driving the rotary member;

an imaging unit for detecting an image which has passed through the light-transmission pattern of the rotary member, and outputs an image signal representing the detected image;

a sync signal generator for generating a sync signal at a predetermined cycle;

a rotational state sensing unit for sensing the rotational state of the rotary member and outputs a sensor signal; and a control circuit for comparing the sensor signal and the sync signal and controlling the rotary drive unit such that the sensor signal is synchronized with the sync signal.

According to a second aspect of the invention, the sync signal generator according to the first aspect includes a sync signal extraction circuit for extracting the sync signal from an image signal output from the imaging unit.

According to the first and second aspects of the invention, even where non-uniform rotation of the rotary member has occurred, the sensor signal corresponding to the rotational state of the rotary member can be synchronized with the vertical sync signal extracted by the vertical sync signal extraction circuit. Thus, the scan cycle of the rotary member can be synchronized with the imaging cycle of the imaging unit.

According to a third aspect of the invention, the imaging unit according to the first aspect has an imaging cycle controlled on the basis of the sync signal output from the sync signal generator.

According to the third aspect, even where non-uniform rotation of the rotary member has occurred, the phase of the sensor signal corresponding to the rotational state of the rotary member can be synchronized with the phase of the vertical sync signal extracted by the vertical sync signal extraction circuit. Thus, the scan cycle of the rotary member can be synchronized with the imaging cycle of the imaging unit.

According to a fourth aspect of the invention, the imaging unit according to the first aspect further comprises:

imaging devices for individually picking up a non-confocal image, which has not passed through the light-transmission pattern, and an image which has passed through the light-transmission pattern; and a differential arithmetic operation device for performing a differential arithmetic operation to subtract the image, which has not passed through the light-transmission pattern, from the image which has passed through the light-transmission pattern, both images being obtained by the imaging devices, whereby a confocal image is obtained.

According to the fourth aspect, the differential arithmetic operation is performed such that the image, which has not passed through the pinholes, is subtracted from the image which has passed through the pinholes. Therefore, a confocal image can be obtained with high optical efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

(First Embodiment)

Figure 1:
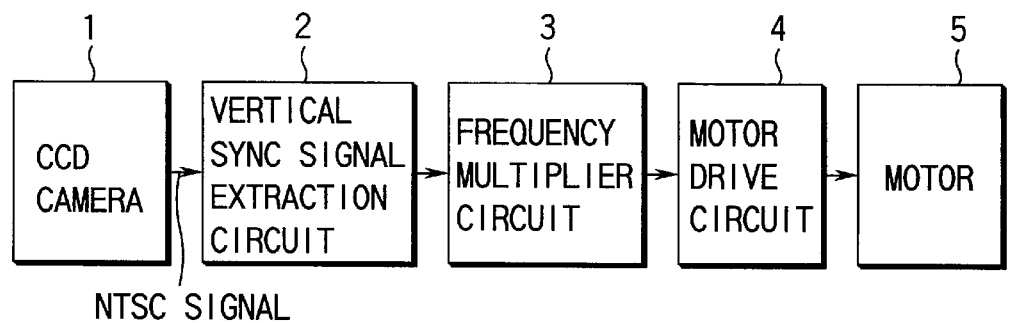
FIG. 1 schematically shows the structure of an example of the conventional confocal microscope.
Figure 2:
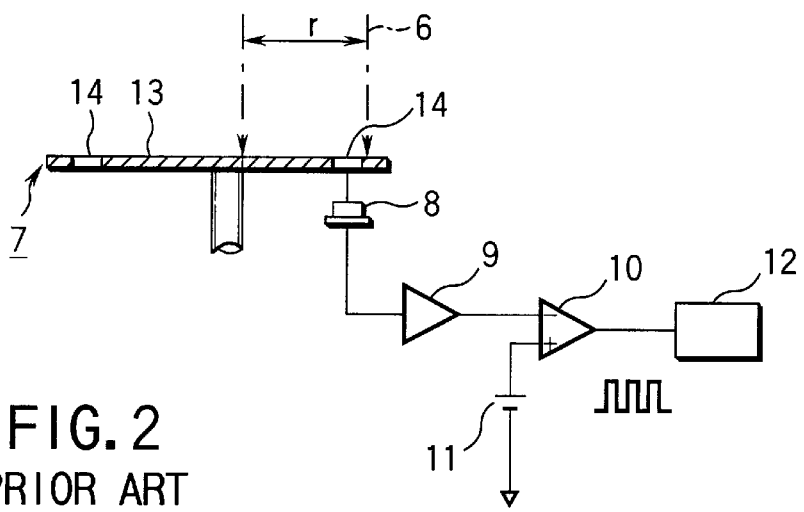
FIG. 2 schematically shows the structure of another example of the conventional confocal microscope.
Figure 3:
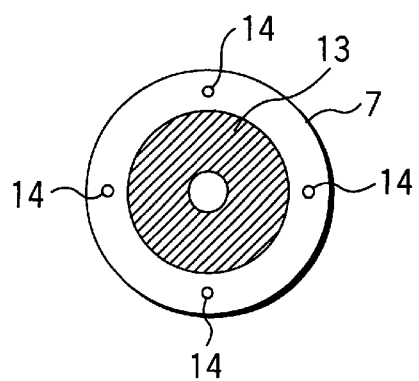
FIG. 3 schematically shows the structure of a scan disk used in the confocal microscope shown in FIG. 2.
Figure 4:
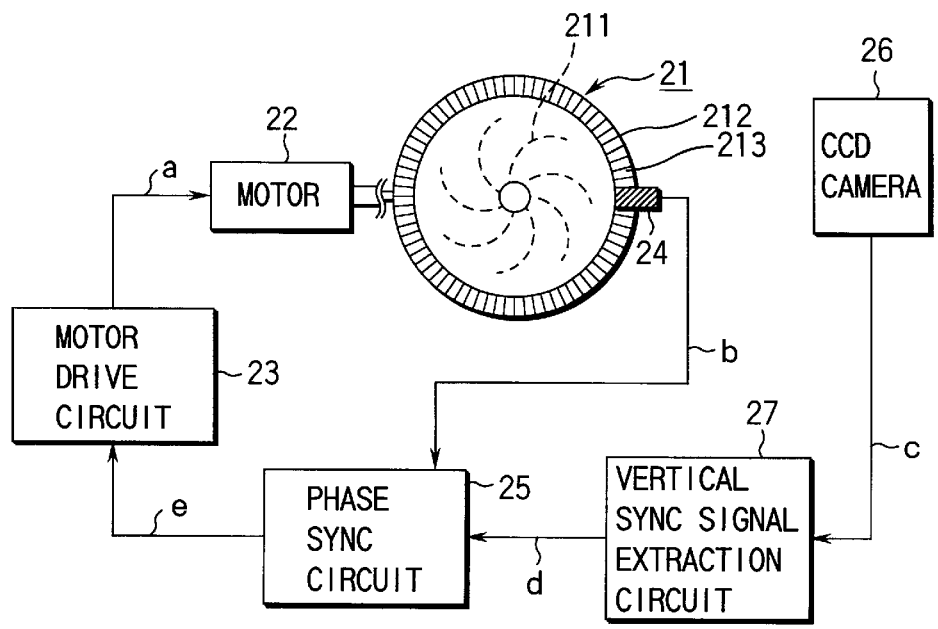
FIG. 4 shows a schematic structure of a first embodiment of the present invention.

FIG. 4 schematically shows the structure of a scanning apparatus which is a main part of a confocal microscope to which the present invention is applied.

In FIG. 4, a pinhole disk 21 is a Nipkow type disk having a number of holes 211 in its inner peripheral portion. The pinholes 211 are arranged spirally from an inner peripheral portion toward an outer peripheral portion of the disk. The outer peripheral portion of the pinhole has a plurality of slit-like light-shield portions 212 and light-transmission portions 213 arranged alternately.

The pinholes 211 and slit-like light-shield portions 212 and light-transmission portions 213 of the pinhole disk 21 are formed by depositing chromium on a disk substrate formed of glass.

The pinhole disk 21 is attached to a rotary shaft of a motor 22. The motor 22 is driven by a motor drive control signal a from a motor drive circuit 23 and thus the disk 21 is rotated.

A photodetector element 24 is provided at the pinhole disk 21.

Figure 5:
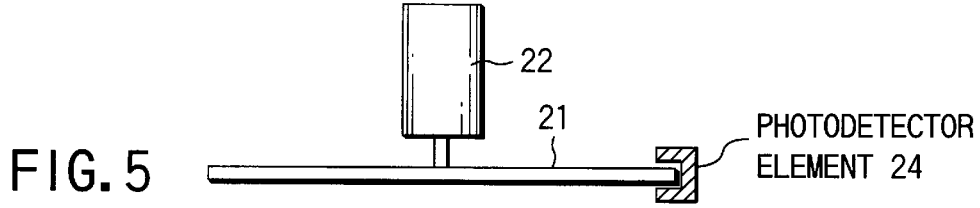
FIG. 5 is a view for describing the relationship between a pinhole disk and a photodetector element used in the first embodiment of the invention.

The photodetector element 24 functions to sense the light-shield portions 212 and light-transmission portions 213 formed at the outer peripheral portion of the pinhole disk 21. The photodetector element 24 has a cross-sectional shape of a square-bracket (]), as shown in FIG. 5, such that it straddles an outer peripheral portion of the pinhole disk 21. The photodetector element 24 outputs a pulse signal b whose level varies alternately as the pinhole disk 21 rotates and the alternately arranged light-shield portions 212 and light-transmission portions 213 pass over the photodetector element 24. This pulse signal b is input to a phase sync circuit 25.

On the other hand, a CCD camera 26 picks up an observation image of a sample (not shown) and outputs an NTSC type image signal c representing a screen image to be displayed on a monitor (not shown).

The CCD camera 26 is connected to a vertical sync signal extraction circuit 27 which comprises an integrator, etc. The vertical sync signal extraction circuit 27 extracts a vertical sync signal from the image signal c output from the CCD camera 26. In this embodiment, for easier processing in the subsequent stage, the vertical sync signal extraction circuit 27 outputs a vertical sync signal d which is obtained by inverting the vertical sync signal extracted from the image signal c. The inverted vertical sync signal d is input to a phase sync circuit 25.

The phase sync circuit 25 receives the vertical sync signal d from the vertical sync signal extraction circuit 27 and the pulse signal b from the photodetector element 24. The phase sync circuit 25 outputs a motor drive control pulse e to the motor drive circuit 23 for controlling the motor 22, thereby synchronizing the signals d and b.

Figure 6:
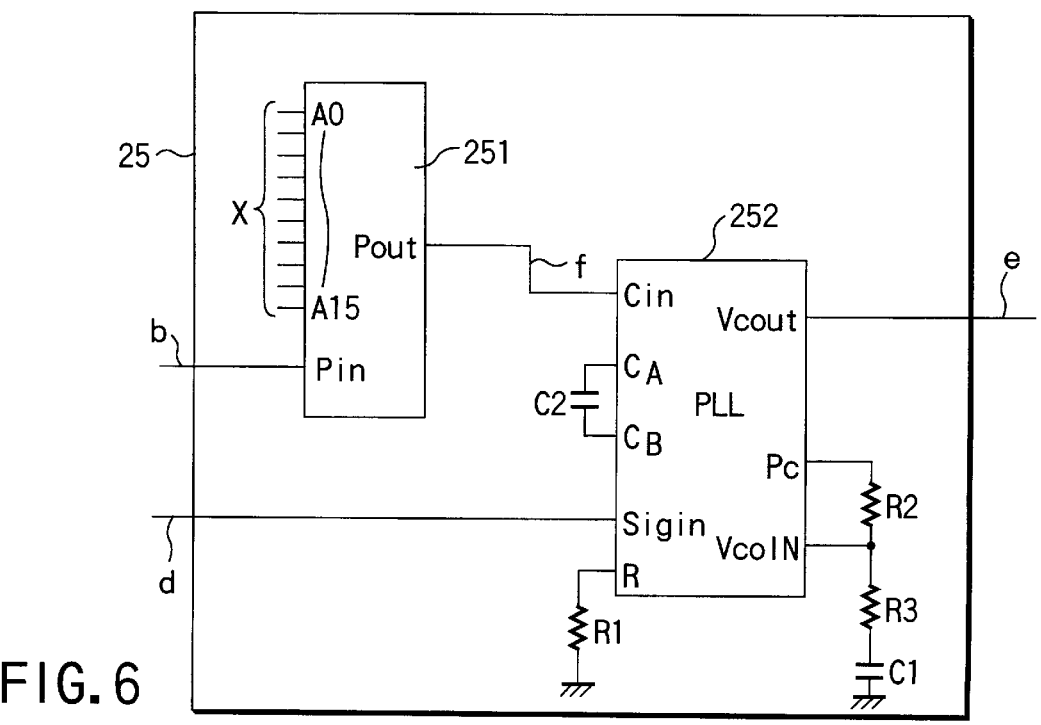
FIG. 6 shows a schematic structure of a phase sync circuit used in the first embodiment.

FIG. 6 shows a specific circuit configuration of the phase sync circuit 25. In FIG. 6, a clock divider 251 converts the pulse signal b input from the photodetector element 24 through an input terminal Pin to a pulse signal with a desired frequency division number and a desired duty cycle. The clock divider 251 is constituted by a FPGA (Field Programmable Gate Array) which can be freely redesigned, and 16-bit terminals X comprising terminals A0 to A15 are operated by a switch (not shown) to determine the frequency division number and duty cycle. In this embodiment, the lower 12-bit terminals are used to determine the frequency division number and the upper 4-bit terminals are used to determine the duty cycle. For example, when terminals A0 to A11 are set at 1000 in the decimal system and terminals A12 to A15 are set at 20 in the decimal system, the pulse signal b is output from an output terminal Pout as a signal f having a cycle of 1000 pulses and a clock with a duty ratio of 20:1000.

The signal f from the clock divider 251 is input to a PLL (Phase-Locked Loop) 252. The PLL 252 keeps the leading edge of the inverted vertical sync signal d from the vertical sync signal extraction circuit 27 in phase with the leading edge of the signal f from the clock divider 251 and outputs the motor control pulse e with a controlled frequency from an output terminal Vcout. The PLL 252 incorporates a VCO (Voltage Controlled Oscillator) which is oscillated by registers R1 to R3 and capacitors C1 and C2. Such terminals (e.g. power supply terminals) of the PLL 252 and peripheral circuits, which are not necessary for the description of the embodiment, are not shown in FIG. 6.

In this manner, the phase sync circuit 25 outputs the motor control pulse e to the motor drive circuit 23. The motor drive circuit 23 receives the motor control pulse e and produces a motor drive control signal a consisting of four-phase clock pulses. The signal a is output to the motor 22. Based on the signal a, the motor 22 rotates the pinhole disk 21.

The operation of the embodiment with the above structure will now be described.

If the scanner apparatus is switched on, the CCD camera 26 starts to image the sample (not shown) and outputs the image signal c to the vertical sync signal extraction circuit 27. The vertical sync signal extraction circuit 27 extracts the vertical sync signal from the image signal c, inverts the signal c, and outputs the inverted vertical sync signal d to the phase sync circuit 25.

In the phase sync circuit 25 which has received the inverted vertical sync signal d, the signal f obtained by frequency-dividing the pulse signal b from the photodetector element 24 by means of the clock divider 251 and the inverted vertical sync signal d are input to the PLL 252. The PLL 252 compares the phases of the signals b and d.

In the state in which the motor 22 is not rotated and accordingly the pinhole disk 21 is not rotated, the clock divider 251 is inoperative. Thus the signal f remains at an L-level. The PLL 252 gradually raises the frequency of the motor control pulse e to be output from the output terminal Vcout, in order to synchronize the phases of the leading edges of the inverted vertical sync signal d and the signal f. Thus the PLL 252 outputs the pulse e to the motor drive circuit 23.

Upon receiving the motor control pulse e from the phase sync circuit 25, the motor drive circuit 23 outputs the motor drive control signal a, which is the four-phase clock, to the motor 22 on the basis of the frequency of the motor control pulse e. The motor 22 rotates the pinhole disk 21 at a speed corresponding to the frequency of the motor drive control signal a.

Figure 7:
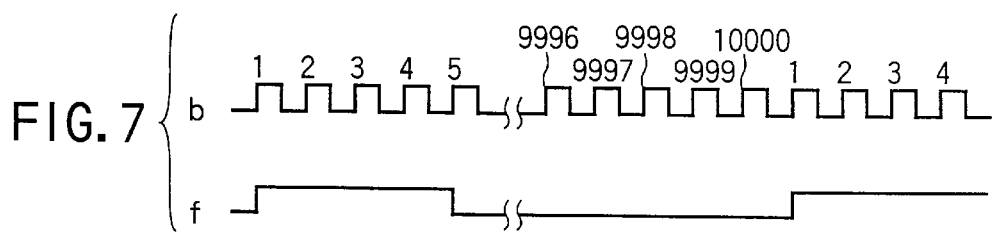
FIG. 7 is a view for describing the operation of the first embodiment.

While the pinhole disk 21 is rotating, the slit-like light-shield portions 212 and light-transmission portions 213 provided at the outer peripheral region of the pinhole disk 21 pass over the photodetector element 24 successively. The photodetector element 24 receives light which has passed through the light-transmission portions 213 and outputs a pulse signal b, as shown in FIG. 7, which has an H-level at a position corresponding to the light-transmission portions 213 and an L-level at a position corresponding to the light-shield portions 212. For example, when 10,000 light-transmission portions 213 are formed at the outer peripheral region of the pinhole disk 21, the photodetector element 24 outputs a pulse signal b comprising 10,000 pulses, each time the pinhole disk 21 makes one complete turn.

If the pulse signal b from the photodetector element 24 is sent to the phase sync circuit 25, the clock divider 251 in the phase sync circuit 25 produces the signal f on the basis of a specified frequency division number and duty ratio. For example, when the clock divider 251 is set at a frequency division number of 10,000 and a duty ratio of 4:10,000, the signal f is output for every 10,000 pulses, as shown in FIG. 7, and the pulse width of H-level components of the signal f corresponds to four clock pulses.

Figure 8:
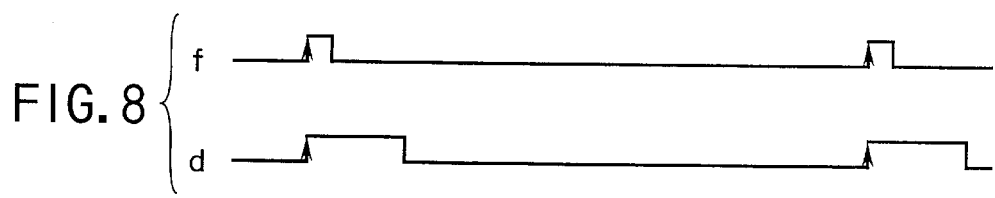
FIG. 8 is a view for describing the operation of the first embodiment.

While the number of revolutions of the pinhole disk 21 is increasing, the PLL 252 constantly monitors the relationship in phase between the leading edges of the inverted vertical sync signal d and the signal f. While the cycle (or frequency) of the signal f is longer (or lower) than that of the inverted vertical sync signal d, the PLL continues to increase the frequency of the motor control pulse e. When the leading edge of the inverted vertical sync signal d has coincided with that of the signal f, that is, when the former has synchronized with the latter, the PLL 252 locks the frequency of the motor control pulse e and maintains this state. Specifically, the state, as shown in FIG. 8, in which the leading edge of the signal f is synchronized with that of the inverted vertical sync signal d, is maintained.

On the other hand, if the rotational cycle of the pinhole disk 21 becomes shorter than that of the inverted vertical sync signal d, that is, if the frequency of the signal f becomes higher, the PLL 252 lowers the frequency of the motor control pulse e, thereby lowering the rotational cycle of the pinhole disk 21. Subsequently, the phase sync circuit 25 repeats the same operational sequence, whereby the number of revolutions of the pinhole disk 21 is controlled and the scan cycle and the image pick-up cycle of CCD camera 26 are synchronized.

A signal representing the rotational state of the pinhole disk 21 is fed back to the phase sync circuit 25, as described above, and thus the inverted vertical sync signal d can constantly be synchronized with the rotational cycle of the pinhole disk 21. Accordingly, the image pick-up cycle of CCD camera 26 is synchronized with the scan cycle of pinhole disk 21, and a screen image with high quality, which is free from a brightness/darkness fringe occurring due to non-uniform scanning of the pinhole disk 21, can be obtained.

In the above embodiment, the frequency division number of the clock divider 251 is set at 10,000. However, the frequency division number is not limited to this, and if it is increased to more than 10,000, e.g. 20,000, the disk can be rotated twice in the time period of a vertical sync signal. Therefore, a flickering of an image due to scanned pinholes is reduced when the image is viewed by the naked eye.

(Second Embodiment)

Figure 9:
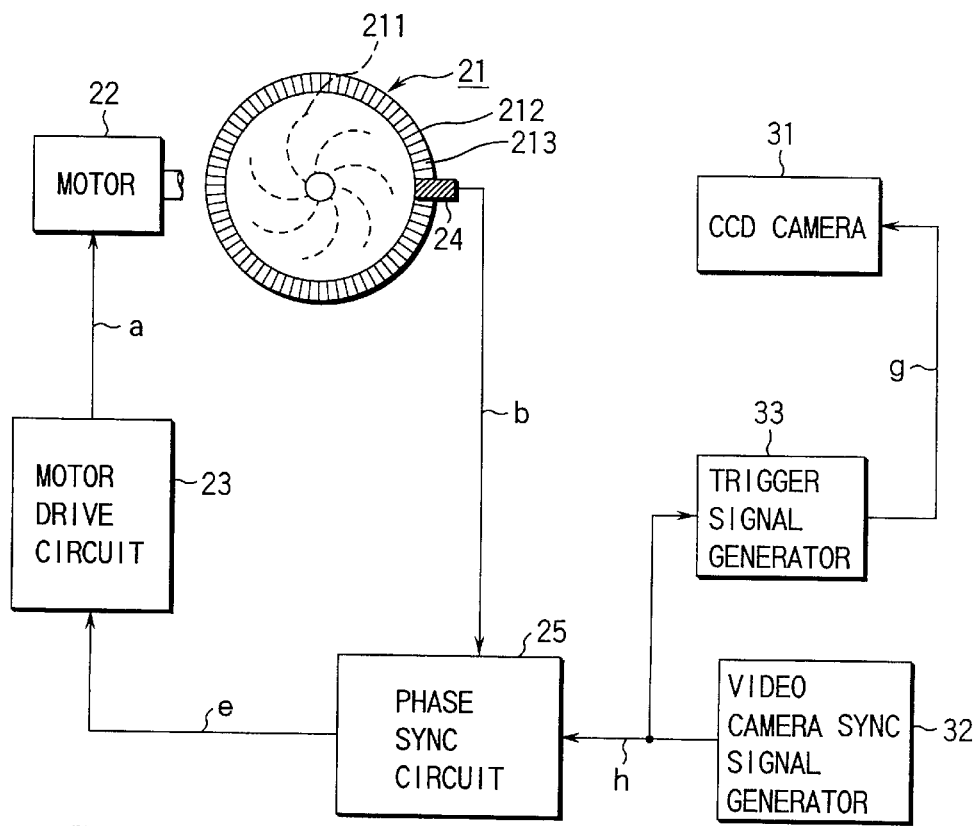
FIG. 9 schematically shows the structure of a second embodiment of the present invention.

FIG. 9 shows a schematic structure of a second embodiment of the present invention. The structural elements common to those in FIG. 4 are denoted by like reference numerals.

In the present embodiment, a CCD camera 31 has an external trigger input terminal, to which a pulse-like trigger signal g is input. The trigger signal g resets an imaging sync signal in the CCD camera 31. In the CCD camera 31, an electric charge is accumulated in a CCD (charge-coupled device) (not shown) in a time period from the input of a first trigger signal g to the input of a second trigger signal g. When the second trigger signal g is input, the CCD camera 31 outputs an acquired image signal to, for example, a TV monitor (not shown).

A video camera sync signal generator 32 generates a vertical sync signal h necessary for driving the video camera, and other sync signals. The generated vertical sync signal h is input to a trigger signal generator 33 and a phase sync circuit 25.

The trigger signal generator 33 comprises a differential circuit, a flip-flop, etc., which are not shown. Upon receiving the vertical sync signal h, the trigger signal generator 33 detects the trailing edge of the signal h and outputs a trigger pulse g to the CCD camera 31.

Upon receiving the vertical sync signal h from the video camera sync signal generator 32 and a pulse signal b from the photodetector element 24, the phase sync circuit 25 outputs a motor control pulse e to the motor drive circuit 23 to synchronize the signals h and b.

Figure 10:
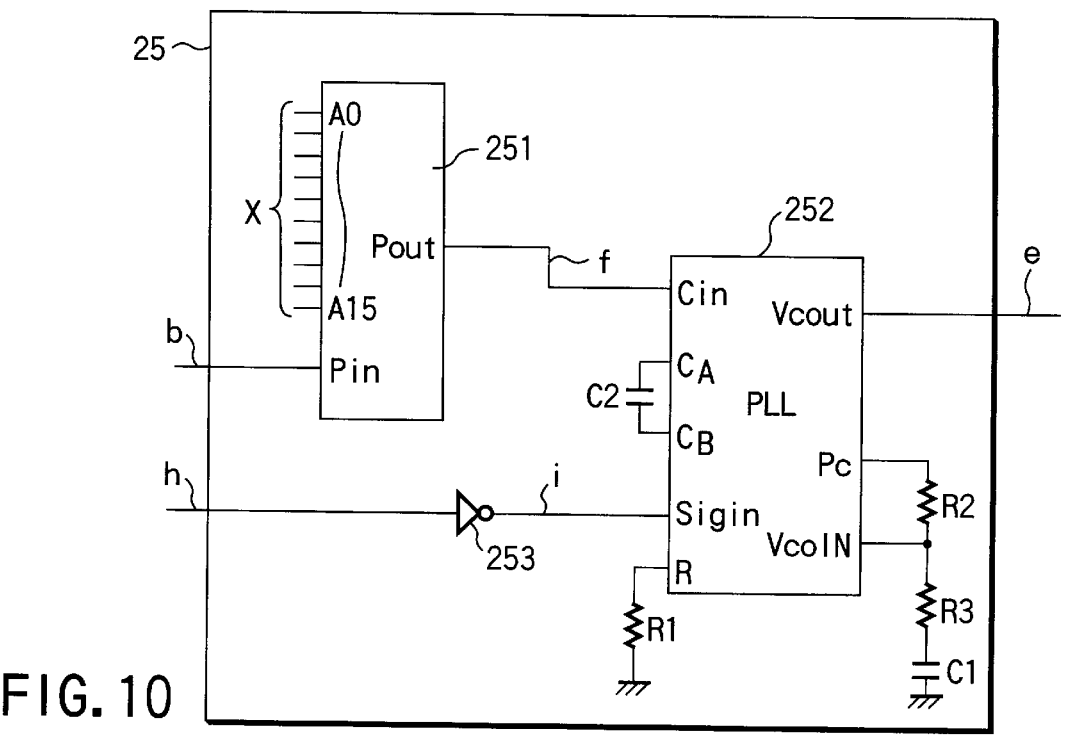
FIG. 10 schematically shows the structure of a phase sync circuit used in the second embodiment of the invention.

FIG. 10 shows a detailed structure of the phase sync circuit 25. The phase sync circuit 25 in this embodiment differs from the phase sync circuit 25 in the first embodiment in that it further includes an inverter 253 for inverting the vertical sync signal h for phase synchronization, in addition to the clock divider 251 and PLL 252. The other structural features are common to those in FIG. 6, and a description thereof is omitted.

The motor drive circuit 23 receives the motor control pulse e from the phase sync circuit 25 and outputs a motor drive control signal a based on the frequency of the motor control pulse e, as a four-phase clock signal for driving the motor 22. The motor 22 rotates the pinhole disk 21 at a speed corresponding to the frequency of the motor drive control signal a.

The operation of this embodiment having the above structure will now be described.

If the scanning apparatus is switched on, the video camera sync signal generator 32 supplies the vertical sync signal h to the phase sync circuit 25 and the trigger signal generator 33. In the phase sync circuit 25, the vertical sync signal h is inverted by the inverter 253 to an inversion signal i and the PLL 252 compares the phase of the inversion signal i with that of the signal f obtained by dividing the frequency of the pulse signal b from the photodetector element 24 through the clock divider 251.

In the state in which the pinhole disk 21 is not rotated, the clock divider 251 is inoperative and the signal f remains at L-level. Accordingly, in order to synchronize the phases of the leading edges of the signals i and f, the PLL 252 gradually increases the frequency of the motor control pulse e to be output from the terminal Vcout and supplies it to the motor drive circuit 23.

The motor drive circuit 23, which has received the motor control pulse e from the phase sync circuit 25, produces a motor drive control signal a as a four-phase clock signal for driving the motor 22, on the basis of the frequency of the motor control pulse e. The motor 22 rotates the pinhole disk 21 at a speed corresponding to the frequency of the motor drive signal a.

Figure 11:
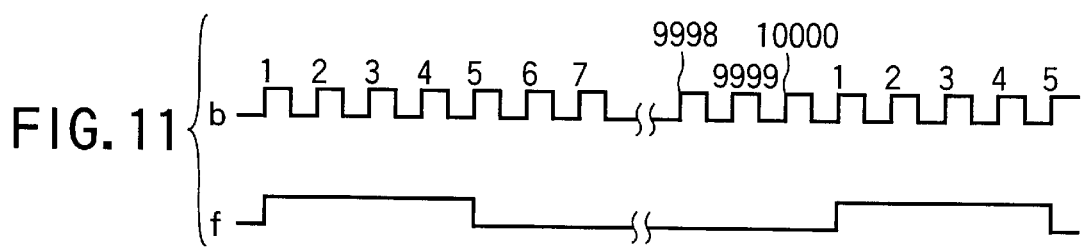
FIG. 11 is a view for describing the operation of the second embodiment.

While the pinhole disk 21 is rotating, the slit-like light-shield portions 212 and light-transmission portions 213 provided at the outer peripheral region of the pinhole disk 21 pass over the photodetector element 24 successively. The photodetector element 24 receives light which has passed through the light-transmission portions 213 and outputs a pulse signal b, as shown in FIG. 11, which has an H-level at a position corresponding to the light-transmission portions 213 and an L-level at a position corresponding to the light-shield portions 212. For example, when 10,000 light-transmission portions 213 are formed at the outer peripheral region of the pinhole disk 21, the photodetector element 24 outputs a pulse signal b comprising 10,000 pulses, each time the pinhole disk 21 makes one complete turn.

Figure 12:
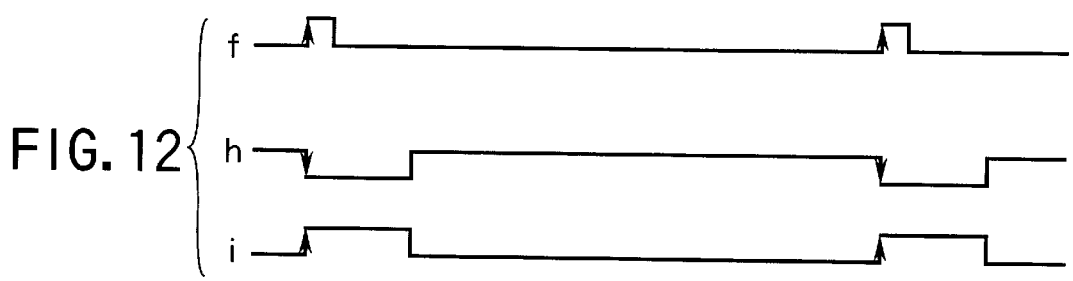
FIG. 12 is a view for describing the operation of the second embodiment.

If the pulse signal b from the photodetector element 24 is sent to the phase sync circuit 25, the clock divider 251 in the phase sync circuit 25 produces the signal f on the basis of a specified frequency division number and duty ratio. For example, when the clock divider 251 is set at a frequency division number of 10,000 and a duty ratio of 4:10,000, the signal f is output for every 10,000 pulses, as shown in FIG. 12, and the pulse width of H-level components of the signal f corresponds to four clock pulses.

While the number of revolutions of the pinhole disk 21 is increasing, the PLL 252 constantly monitors the relationship in phase between the leading edges of the inverted signal i of the vertical sync signal h and the signal f. While the cycle (or frequency) of the signal f is longer (or lower) than that of the inverted signal i of the vertical sync signal h, the PLL continues to increase the frequency of the motor control pulse e. When the leading edge of the inverted signal i of the vertical sync signal h has coincided with that of the signal f, that is, when the former has synchronized with the latter, the PLL 252 locks the frequency of the motor control pulse e and maintains this state. Specifically, the state, as shown in FIG. 12, in which the leading edge of the signal f is synchronized with that of the inverted signal i of the vertical sync signal h, is maintained.

If the rotational cycle of the pinhole disk 21 becomes shorter than that of the inverted signal i of the vertical sync signal h, that is, if the frequency of the signal f becomes higher, the PLL 252 lowers the frequency of the motor control pulse e, thereby lowering the rotational cycle of the pinhole disk 21. Subsequently, the phase sync circuit 25 repeats the same operational sequence, whereby the number of revolutions of the pinhole disk 21 is controlled and the scan cycle of the pinhole disk 21 and the image pick-up cycle of CCD camera 31 are synchronized.

Figure 13:
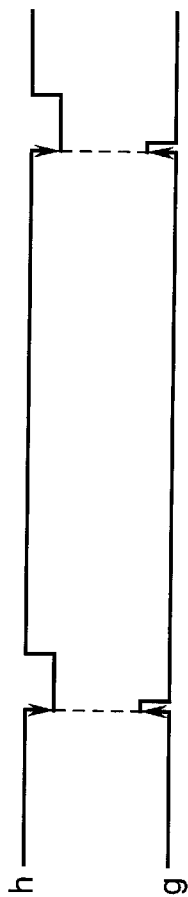
FIG. 13 is a view for describing the operation of the second embodiment.

On the other hand, if the vertical sync signal h from the video camera sync signal generator 32 is input to the trigger signal generator 33 in this state, the trigger signal generator 33 detects the leading edge of the vertical sync signal h and outputs a image pick-up trigger signal g, as shown in FIG. 13, to the CCD camera 31.

Figure 14:
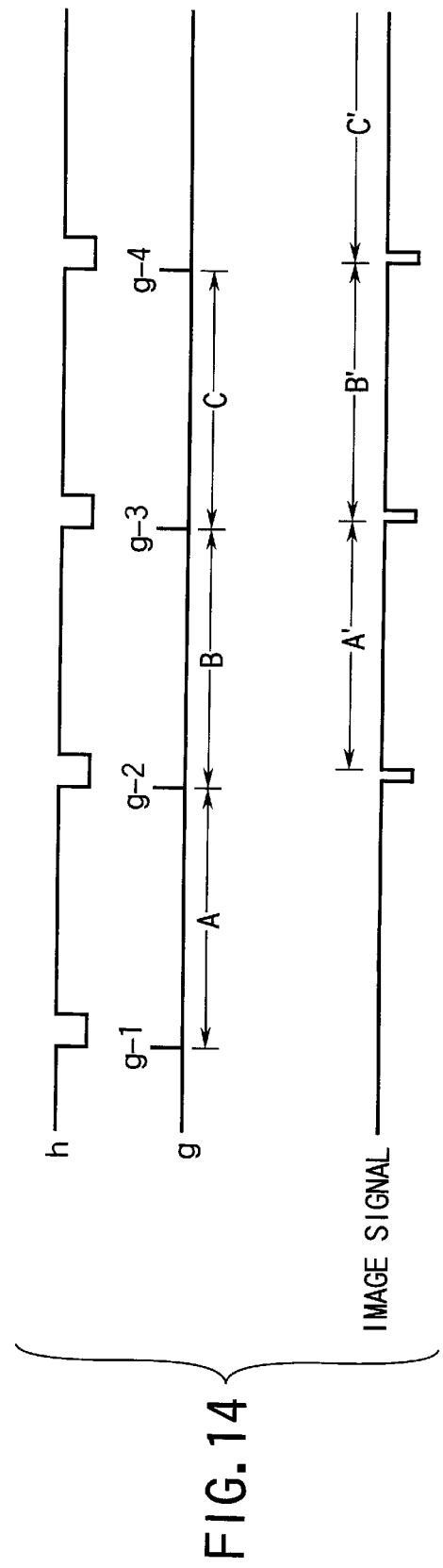
FIG. 14 is a view for describing the operation of the second embodiment.

An operation in the case where the trigger signal g has been input to the CCD camera 31 will now be described with reference to FIG. 14. As is shown in FIG. 14, when a trigger signal g-1 has been input to the CCD camera 31 from the trigger signal generator 33, the trigger signal g-1 resets the internal sync circuit within the CCD camera 31. The CCD (not shown) in the CCD camera 31 starts imaging (imaging period A). If the next trigger signal g-2 is input to the CCD camera 31, the CCD camera 31 outputs an image picked up in the imaging period A as an image signal A'. At the same time as the output of the image signal, the CCD (not shown) starts imaging once again (imaging period B). The same operational sequence is performed with respect to trigger signals g-3 and g-4.

In this manner, the trigger signal generator 33 instructs the timing of the start of imaging and the output of the image signal for the CCD camera 31 (imaging periods A, B and C; image signals A', B' and C'). Once the trigger signal g is input to start imaging, the CCD in the CCD camera 31 continues to accumulate a charge corresponding to the image until the next trigger signal g is input. Thus, even a sample with low brightness can be clearly imaged. More specifically, the sample with low brightness can be clearly imaged by the CCD camera 31, by increasing the output cycle of the trigger signal g by an integer number of times of the cycle of the vertical sync signal h through the trigger signal generator 33.

As has been described above, according to the structure of the present embodiment, like the first embodiment, the imaging cycle of the CCD camera 31 and the scan cycle of the pinhole disk 21 can be synchronized. Accordingly, it is possible to obtain a high-quality screen image free from a brightness/darkness fringe due to non-uniform scanning of the disk. Moreover, even if the brightness of the light source is low, the cycle of the trigger signal g is controlled and the imaging cycle is increased. Thereby, even the sample with low brightness can be clearly imaged and a bright screen image can be obtained.

(Third Embodiment)

Figure 15:
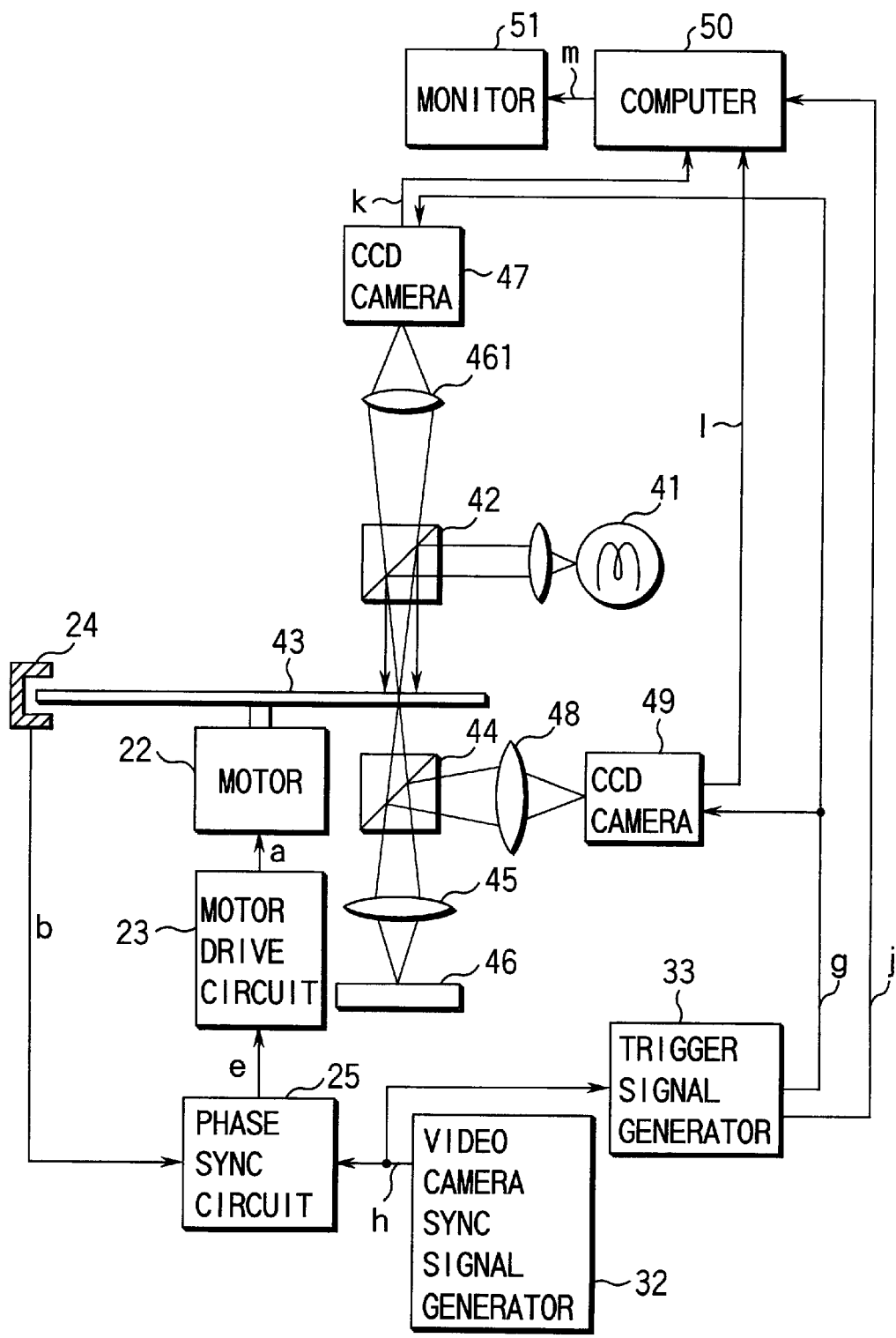
FIG. 15 schematically shows the structure of a third embodiment of the present invention.

FIG. 15 shows a schematic structure of a third embodiment of the present invention. In this embodiment, an optical system is included in addition to the scanning apparatus of the confocal microscope in the second embodiment. The structural elements common to those in FIG. 9 are denoted by like reference numerals.

In this embodiment, light from a light source 41 such as a halogen lamp, etc. is reflected by a half-mirror 42, and the reflection light is radiated onto a pinhole disk 43.

Figure 16:
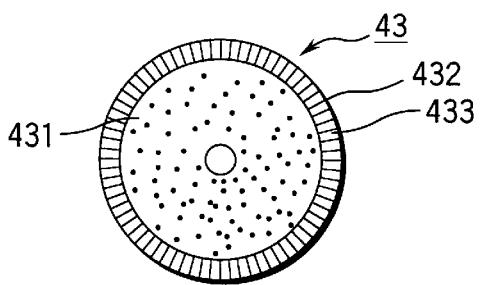
FIG. 16 schematically shows the structure of a pinhole disk used in the third embodiment of the invention.

FIG. 16 shows a detailed structure of the pinhole disk 43. The pinhole disk 43 has a pinhole portion 431 in which pinholes are formed at random over an inner peripheral portion of the pinhole disk 43. The interval between the pinholes in the pinhole portion 431 is equal to the diameter of each pinhole. Accordingly, the density of pinholes in the pinhole portion 431 is much higher than that of Nipkow disk, and thus a greater amount of light from a sample can be passed through the pinhole disk 43. Like the first and second embodiments, slit-like light-shield portions 432 and light-transmission portions 433 are formed at an outer peripheral portion of the pinhole disk 43. The material of the pinhole disk 43 is the same as that of the disk in the first embodiment.

The optical disk of the present embodiment is constructed such that light which has passed through the pinhole portion 431 of the pinhole disk 43 is projected on a sample 46 via a half-mirror 44 and an objective lens 45. In this structure, a pinhole pattern of the pinhole portion 431 is made by calculations such that the sample 46 may be uniformly illuminated by a single complete turn of the pinhole disk 43.

Reflection light or fluorescent light from the sample 46 is divided into two beams, one passing through the half-mirror 44, and the other being reflected by the half-mirror 44. The light beam, which has passed through the half-mirror 44, passes through the pinhole disk 43, the half-mirror 42 and a converging lens 461 and enters a CCD camera 47. On the other hand, the light beam which has been reflected by the half-mirror 44 is converged on a CCD camera 49 through a converging lens 48.

Each of the CCD cameras 47 and 49 has an external trigger input terminal to which a pulse trigger signal g is input. If the trigger signal g is input to the CCD camera 47, 49 from the trigger signal generator 33, the imaging sync signal in the CCD camera 47, 49 is reset by the trigger signal g. In the time period from the input of the first trigger signal g to the input of the second trigger signal g, a charge is accumulated in the CCD (not shown) in the CCD camera 47, 49. If the second trigger signal g is input, the CCD camera 47, 49 outputs an acquired image signal k, l to a computer 50.

On the other hand, the phase sync circuit 25 receives the vertical sync signal h from the video camera sync signal generator 32 and the pulse signal b from the photodetector element 24 and outputs the motor control pulse e to the motor drive circuit 23 to synchronize the signals h and b. The motor drive circuit 23, which has received the motor control pulse e from the phase sync circuit 25, outputs the motor drive control signal a based on the frequency of the motor control pulse e, as the four-phase clock signal for driving the motor 22. The motor 22 rotates the pinhole disk 43 at a speed corresponding to the frequency of the motor drive control signal a.

Figure 17:
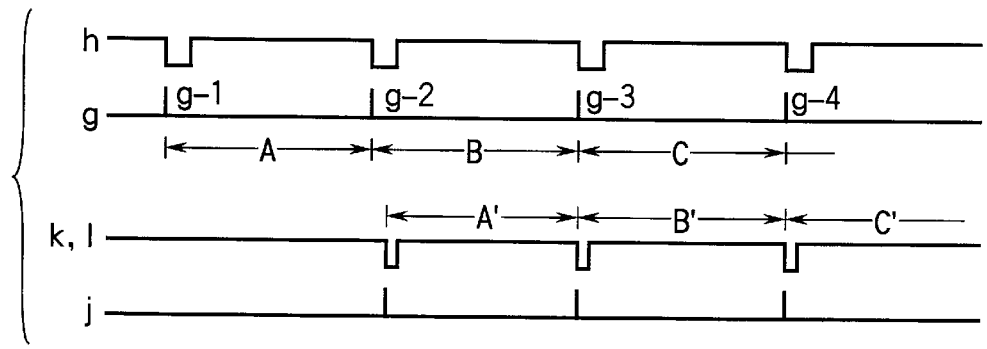
FIG. 17 is a view for describing the operation of the third embodiment.

The trigger signal generator 33 comprises a differential circuit, a flip-flop, etc., which are not shown. Upon receiving the vertical sync signal h from the video camera sync signal generator 32, the trigger signal generator 33 detects the trailing edge of the signal h and outputs the trigger pulse g to the CCD cameras 47 and 49 and also a timing pulse j representing the timing at which the computer 50 receives the image signals k and l from the CCD cameras 47 and 49. FIG. 17 shows the relationship in phase among the signals g, h, k, l and j.

The computer 50 has an internal memory which stores the image signals k and l from the CCD cameras 47 and 49 at the timing of the image take-in signal j from the trigger signal generator 33. The computer 50 performs a differential arithmetic operation for the two image signals k and l. A monitor 51 displays a signal m input from the computer 50 as a differential arithmetic image.

Figure 18:
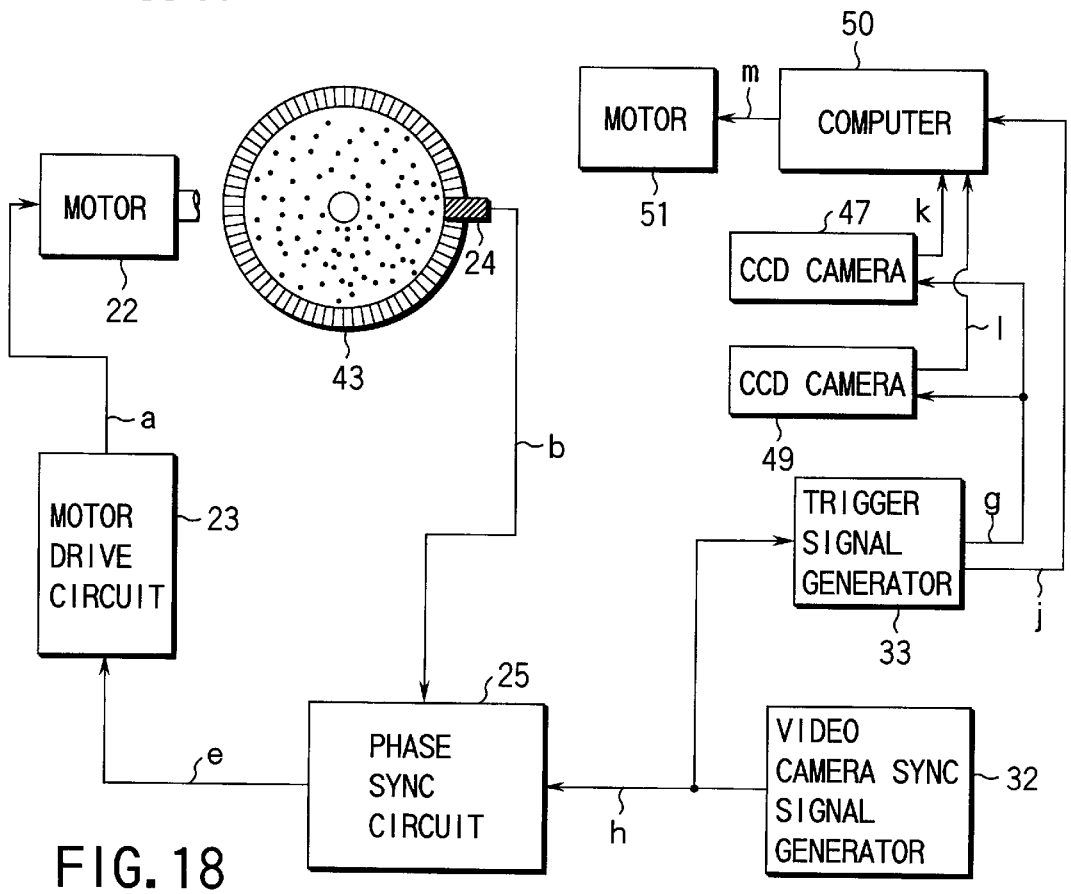
FIG. 18 is a view for describing the operation of the third embodiment.

The operation of the present embodiment will now be described. In FIG. 18, the optical system shown in FIG. 15 is removed for the purpose of easier understanding.

If the scanning apparatus is switched on, the video camera sync signal generator 32 supplies the vertical sync signal h to the phase sync circuit 25 and the trigger signal generator 33. In the phase sync circuit 25, the vertical sync signal h is inverted by the inverter 253 to the inversion signal i and the PLL 252 compares the phase of the inversion signal i with that of the signal f obtained by dividing the frequency of the pulse signal b from the photodetector element 24 through the clock divider 251.

In the state in which the pinhole disk 43 is not rotated, the clock divider 251 is inoperative and the signal f remains at L-level. Accordingly, in order to synchronize the phases of the leading edges of the signals i and f, the PLL 252 gradually increases the frequency of the motor control pulse e to be output from the terminal Vcout and supplies it to the motor drive circuit 23.

The motor drive circuit 23, which has received the motor control pulse e from the phase sync circuit 25, produces the motor drive control signal a as the four-phase clock signal for driving the motor 22, on the basis of the frequency of the motor control pulse e. The motor 22 rotates the pinhole disk 21 at a speed corresponding to the frequency of the motor drive signal a.

While the pinhole disk 43 is rotating, the slit-like light-shield portions 432 and light-transmission portions 433 provided at the outer peripheral region of the pinhole disk 43 pass over the photodetector element 24 successively. The photodetector element 24 receives light which has passed through the light-transmission portions 433 and outputs the pulse signal b, as shown in FIG. 11, which has an H-level at a position corresponding to the light-transmission portions 433 and an L-level at a position corresponding to the light-shield portions 432. For example, when 10,000 light-transmission portions 433 are formed at the outer peripheral region of the pinhole disk 43, the photodetector element 24 outputs the pulse signal b comprising 10,000 pulses, each time the pinhole disk 43 makes one complete turn.

If the pulse signal b from the photodetector element 24 is sent to the phase sync circuit 25, the clock divider 251 in the phase sync circuit 25 produces the signal f on the basis of a specified frequency division number and duty ratio. For example, when the clock divider 251 is set at a frequency division number of 10,000 and a duty ratio of 4:10,000, the signal f is output for every 10,000 pulses, as shown in FIG. 11, and the pulse width of H-level components of the signal f corresponds to four clock pulses.

While the number of revolutions of the pinhole disk 43 is increasing, the PLL 252 constantly monitors the relationship in phase between the leading edges of the inverted signal i of the vertical sync signal h and the signal f. While the cycle (or frequency) of the signal f is longer (or lower) than that of the inverted signal i of the vertical sync signal h, the PLL 252 continues to increase the frequency of the motor control pulse e. When the leading edge of the inverted signal i of the vertical sync signal h has coincided with that of the signal f, that is, when the former has synchronized with the latter, the PLL 252 locks the frequency of the motor control pulse e and maintains this state. Specifically, the state, as shown in FIG. 12, in which the leading edge of the signal f is synchronized with that of the inverted signal i of the vertical sync signal h, is maintained.

On the other hand, if the rotational cycle of the pinhole disk 43 becomes shorter than that of the inverted vertical sync signal i of the vertical sync signal h, that is, if the frequency of the signal f becomes higher, the PLL 252 lowers the frequency of the motor control pulse e, thereby lowering the rotational cycle of the pinhole disk 43. Subsequently, the phase sync circuit 25 repeats the same operational sequence, whereby the number of revolutions of the pinhole disk 43 is controlled and the scan cycle and the image pick-up cycle of CCD camera 47, 49 are synchronized.

In this state, if the vertical sync signal h from the video camera sync signal generator 32 is input to the trigger signal generator 33, the trigger signal generator 33 detects the trailing edge of the vertical sync signal h, as shown in FIG. 17, and outputs the imaging trigger signal g to the CCD cameras 47 and 49 and also outputs the capture trigger signal j to the computer 50, thereby to permit the computer 50 to receive the image signals k and l.

In this case, the internal sync circuit in the CCD camera 47, 49 is reset by the trigger signal g-1 produced from the trigger signal generator 33, and the CCD (not shown) in the CCD camera 47, 49 starts imaging (imaging period A). If the next trigger signal g-2 is input to the CCD cameras 47 and 49, an image signal A' corresponding to the imaging period A is produced as an image signal k, l. At the same time, the CCD camera starts imaging (imaging period B). Furthermore, the trigger signal generator 33 outputs the signal j to the computer 50, thereby instructing the timing at which the computer 50 receives the image signals k and l from the CCD cameras 47 and 49.

In this manner, the trigger signal generator 33 sends instructions to the CCD cameras 47, 49 and the computer 50 to determine the timing for image-pickup and take-in of image signals (imaging time periods A, B and C; image signals A', B' and C'). At the timing defined by the capture trigger signal j, the computer 50 captures the image signals k and l from the CCD cameras 47 and 49 and stores them in the memory (not shown).

In this case, the image signal k from the CCD camera 47 represents the image of the sample, which has returned through the pinholes in the pinhole disk 43 and includes a confocal component and a non-confocal component. On the other hand, the image signal l from the CCD camera 49 represents the image of the sample, which has not yet returned to the pinholes in the pinhole disk 43 and includes only the non-confocal component. The computer 50 forms a confocal image by subtracting the image of the CCD camera 49 from the image of the CCD of the CCD camera 47 in the memory (i.e. by carrying out a differential arithmetic operation between both images) with use of a specific coefficient, and outputs a signal m representing the confocal image to the monitor 51.

The confocal image can thus be displayed in real time on the monitor 51. In addition, when the trigger signal g is input to the CCD cameras 47 and 49 to start imaging, the CCDs in the CCD cameras continue to accumulate images until the next trigger signal g is input. Thus, the sample even with low brightness can be imaged clearly. The sample with low brightness can also be imaged clearly by causing the trigger signal generator 33 to increase the output cycle of the trigger signal g by an integer number of times the cycle of the vertical sync signal h.

Since the imaging cycle of the CCD camera 47 can also be synchronized with the scan cycle of the pinhole disk 43 by this method, a high-quality confocal image can be obtained after the differential arithmetic operation, without occurrence of a brightness/darkness fringe due to non-uniform scanning of the disk. Moreover, since the random pinhole disk is used as pinhole disk 43, the confocal image can be obtained with high optical efficiency and thus high-quality confocal images can be obtained with use of inexpensive illuminating means with low illuminance.

(Fourth Embodiment)

Figure 19:
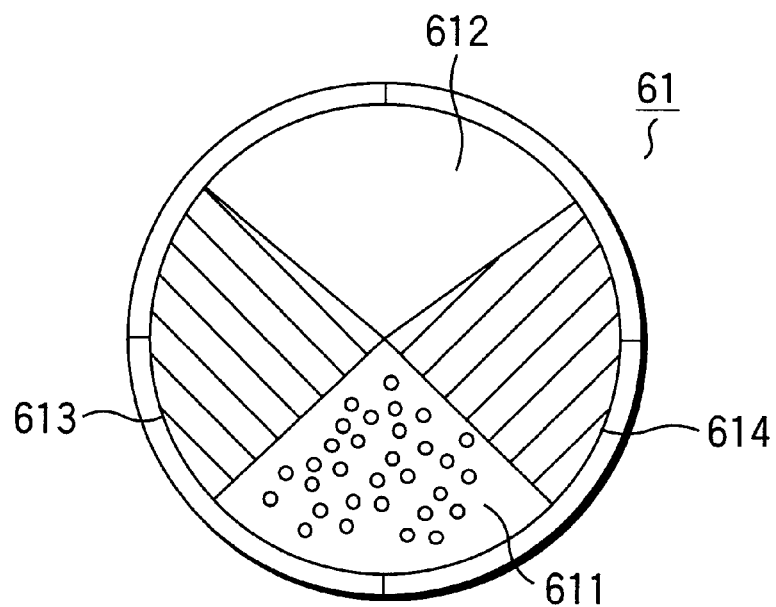
FIG. 19 schematically shows the structure of a disk used in a fourth embodiment of the invention.

FIG. 19 shows the structure of a pinhole disk 61 which is a main component of a confocal microscope to which the present invention is applied. As is shown in FIG. 19, the pinhole disk 61 includes a pinhole portion 611 having pinholes arranged at random and an opening portion 612, which are opposed to each other. Light-shield portions 613 and 614 are formed between the pinhole portion 611 and the opening portion 612. A plurality of pinholes are arranged at random over the pinhole portion 611. The arrangement of the pinholes is determined such that when the disk 61 is rotated and a sample (not shown) is scanned by the pinhole portion 611 of disk 61, the sample may be uniformly illuminated with illumination light.

If the speed control in this embodiment is effected by using the disk 61, a confocal image corresponding to the pinhole portion 611 is formed on an EVEN field of a frame image obtained by the CCD camera, and a bright visual-field image corresponding to the opening portion 612 is formed on an ODD field of the frame image. The confocal image and bright visual-field image can be simultaneously displayed on a monitor by performing an image process such that the ODD/EVEN fields of ODD/EVEN identification signals obtained from the frame image may be displayed separately.

OTHER EMBODIMENTS

Figure 20:
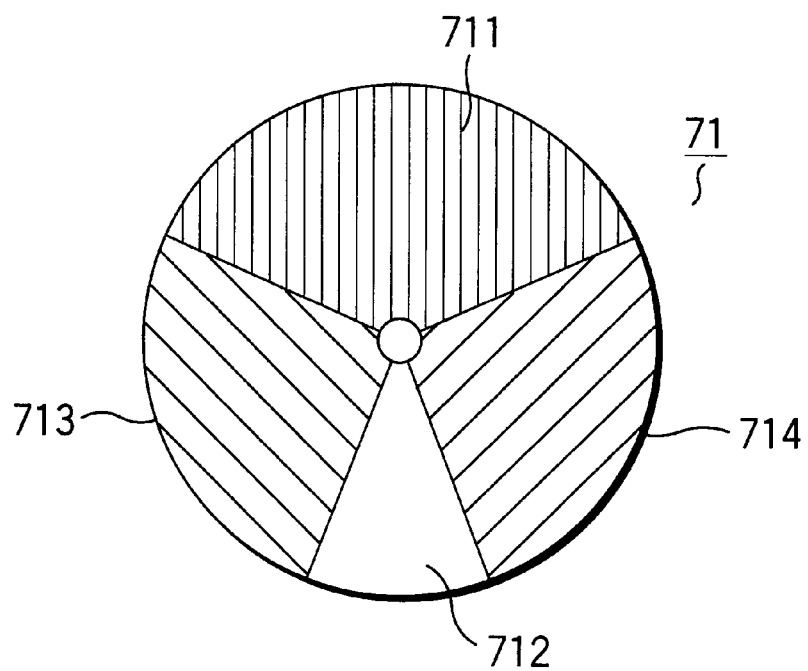
FIG. 20 schematically shows the structure of a disk used in another embodiment of the invention.

In the above embodiments, the opening portion of the disk has pinholes, but it may have line patterns instead of pinholes. FIG. 20 shows the structure of a disk 71 having a line pattern portion 711. The disk 71 has the line pattern portion 711 and an opening portion 712 so arranged as to be opposed to each other. Light-shield patterns 713 and 714 are formed between the line pattern portion 711 and the opening portion 712.

Figure 21:
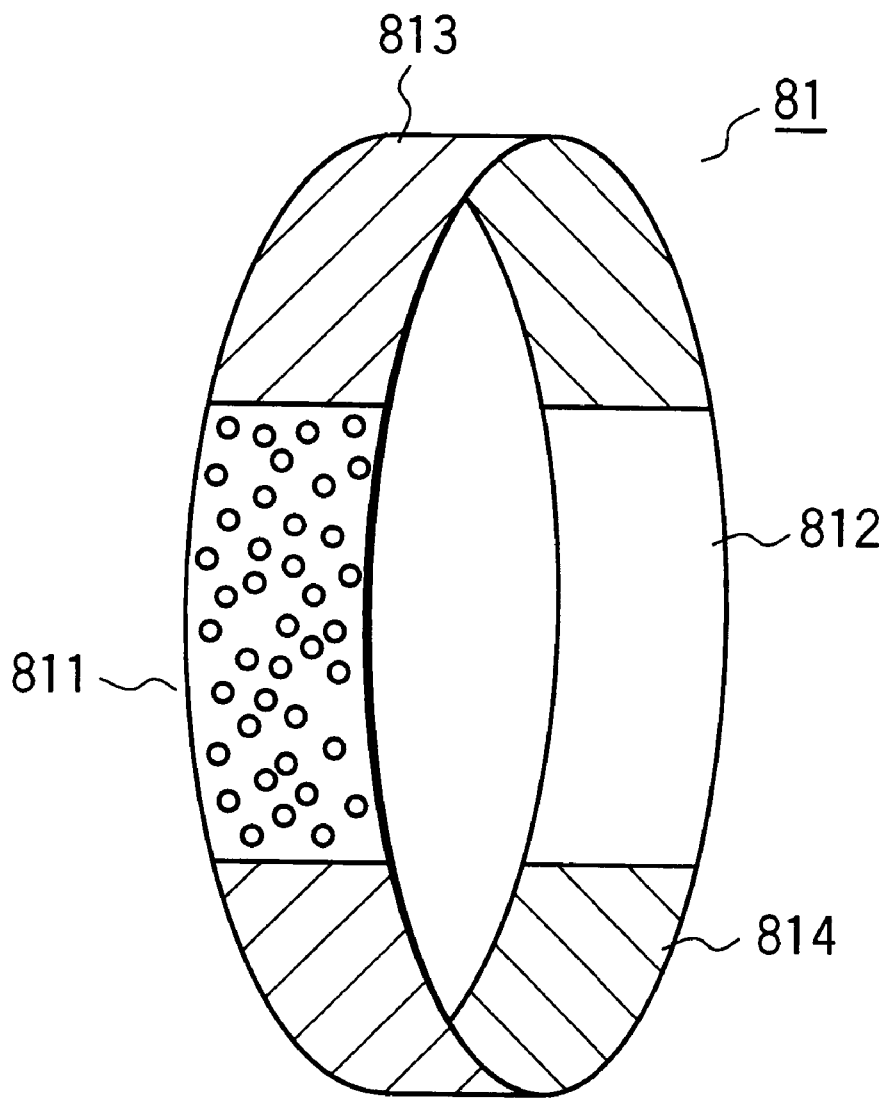
FIG. 21 schematically shows the structure of a disk used in another embodiment of the invention.

The pinhole rotary members in the preceding embodiments are all disk-shaped ones. The pinhole rotary member may be, for example, a cylindrical one, a belt-shaped one, etc. FIG. 21 shows the structure of a cylindrical rotary member 81. The rotary member 81 has a pinhole portion 811 and a opening portion 812 so arranged as to be opposed to each other. Light-shield patterns 813 and 814 are formed between the pinhole portion 811 and the opening portion 812.

In the above embodiment, the rotational state of the disk is sensed by the photosensor element provided at the periphery of the disk, but it may be sensed by an output from the rotary shaft of the disk or the driving motor. The photodetector element may be replaced with a magnetic sensor capable of sensing the rotational state. The present invention is applicable to any type of optical microscope wherein images are obtained by synchronizing the opening portion of the rotary member with the rotational state of the rotary member, for example, a centrifuge microscope wherein a sample chamber for containing a sample is provided at an opening portion of the disk and the CCD camera picks up an image which has passed through the sample in the sample chamber.

According to the invention the scan cycle of a rotary member with pinholes can be synchronized with the imaging cycle of imaging unit. It is thus possible to obtain a high-quality image free from a brightness/darkness fringe due to non-uniform scanning of the rotary member.

According to the invention a clear confocal image is obtained even if the luminance of a light source is low. In addition, a clear image of a sample even with low brightness is obtained by increasing the imaging cycle.

According to the invention a high-quality confocal image can be obtained with enhanced optical efficiency even if an inexpensive illuminating system with low illuminance is used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image detection apparatus comprising:

a rotary member having a light-transmission pattern;

a rotary drive unit for driving the rotary member;

a first imaging unit for detecting an image which has passed through the light-transmission pattern of the rotary member, and outputs an image signal representing the detected image;

a sync signal generator for generating a sync signal at a predetermined cycle;

a rotational state sensing unit for sensing the rotational state of the rotary member and outputs a sensor signal; and a control circuit for comparing the sensor signal and the sync signal and controlling the rotary drive unit such that the sensor signal is synchronized with the sync signal.

2. An image detection apparatus according to claim 1, wherein the control circuit compares and synchronizes a phase obtained from the rotational state of the rotary member and a phase of the sync signal.

3. An image detection apparatus according to claim 1, wherein the control circuit compares and synchronizes a rotational cycle obtained from the rotational state of the rotary member and a frequency of the sync signal.

4. An image detection apparatus according to claim 1, wherein said sync signal generator includes a sync signal extraction circuit for extracting the sync signal from an image signal output from the first imaging unit.

5. An image detection apparatus according to claim 1, wherein said first imaging unit has an imaging cycle controlled on the basis of the sync signal output from the sync signal generator.

6. An image detection apparatus according to claim 1, wherein said first imaging unit has an imaging cycle controlled on the basis of a timing at which a trigger signal, which has an output cycle corresponding to n-times (n=a natural number) a cycle of the sync signal output from the sync signal generator, is produced.

7. An image detection apparatus according to claim 1, wherein said first control circuit divides a frequency of the sensor signal and compares a resultant signal with the sync signal.

8. An image detection apparatus according to claim 1, wherein the image, which has passed through the light-transmission pattern of the rotary member, is a confocal image.

9. An image detection apparatus according to claim 1, further comprising:
- a second imaging unit for individually picking up a non-confocal image, which has not passed through the light-transmission pattern; and
- a differential arithmetic operation unit for performing a differential arithmetic operation to subtract the image, which has not passed through the light-transmission pattern, from the image which has passed through the light-transmission pattern, both images being obtained by said first and second imaging devices, whereby a confocal image is obtained.

10. An image detection apparatus according to claim 1, wherein said sync signal is a vertical sync signal.

11. An image detection apparatus according to claim 1, wherein said sync signal is an ODD/EVEN identification signal.

12. An image detection apparatus according to claim 1, wherein said rotary member is a rotary disk.

13. An image detection apparatus according to claim 1, wherein said light-transmission pattern is a pinhole pattern.

14. An image detection apparatus according to claim 1, wherein said light-transmission pattern is a line pattern.

15. An image detection apparatus according to claim 1, wherein said rotary member is a cylindrical rotary member having the light-transmission pattern on its outer peripheral surface.

16. An image detection apparatus according to claim 1, wherein said light-transmission pattern is a pinhole pattern with pinholes arranged at random over the rotary member.

17. An image detection apparatus according to claim 1, wherein said rotary member is a rotary disk and said light-transmission pattern is a plurality of pinhole pattern with pinholes spirally arranged from an inner peripheral portion toward an outer peripheral portion of the rotary disk.

18. An image detection apparatus according to claim 1, wherein said rotary member is a rotary disk and said light-transmission pattern is divided into a first region and a second region which are opposed to each other with respect to a central axis of the rotary disk, each of the first and second regions having both end portions adjoining light-shield patterns, said first region being a region provided with a plurality of minute holes capable of passing light through, and said second region being a region passing light through.

* * * * *